United States Patent
Sotoodeh et al.

(10) Patent No.: US 9,124,364 B1
(45) Date of Patent: Sep. 1, 2015

(54) QUADRATURE POWER BALANCE CONTROL IN OPTICAL TRANSMITTERS

(75) Inventors: Mohammad Sotoodeh, Ottawa (CA); Gary Mak, Ottawa (CA); Yves Beaulieu, Gatineau (CA)

(73) Assignee: CIENA CORPORATION, Hanover, MD (US)

( * ) Notice: Subject to any disclaimer, the term of this patent is extended or adjusted under 35 U.S.C. 154(b) by 587 days.

(21) Appl. No.: 13/483,622

(22) Filed: May 30, 2012

(51) Int. Cl.
*H04B 10/079* (2013.01)
*H04B 10/50* (2013.01)

(52) U.S. Cl.
CPC ...... *H04B 10/0799* (2013.01); *H04B 10/50577* (2013.01)

(58) Field of Classification Search
None
See application file for complete search history.

(56) References Cited

U.S. PATENT DOCUMENTS

| | | | |
|---|---|---|---|
| 2003/0175037 A1* | 9/2003 | Kimmitt et al. | 398/198 |
| 2009/0115544 A1* | 5/2009 | Kershteyn et al. | 332/103 |
| 2009/0244685 A1* | 10/2009 | Hoshida et al. | 359/279 |
| 2009/0245795 A1* | 10/2009 | Joyner et al. | 398/79 |

OTHER PUBLICATIONS

Mohammad Sotoodeh, et al. "Modulator Bias and Optical Power Control of Optical Complex E-Field Modulators" Journal of Lightwave Technology, vol. 29, No. 15, Aug. 1, 2011, pp. 2235-2248.

* cited by examiner

*Primary Examiner* — David Payne
*Assistant Examiner* — Jasmine Boutte
(74) *Attorney, Agent, or Firm* — Kent Daniels; Daniels IP Services Ltd (57) ABSTRACT

A method of controlling an optical transmitter having a Dual Parallel Mach-Zehnder (DPMZ) modulator. An I-Q power balance between respective branches of the DPMZ modulator is detected, and at least one parameter of the DPMZ modulator is adjusted to drive the I-Q power balance to a predetermined target value. An optical transmitter may have Quad Parallel Mach-Zehnder (QPMZ) modulator having a pair of parallel DPMZ modulators for modulating respective X- and Y-polarization lights. In such cases, an X-Y power imbalance between the two polarization lights is detected, and at least one parameter of the QPMZ modulator is adjusted to drive the X-Y power imbalance to a predetermined value.

17 Claims, 7 Drawing Sheets

QUADRATURE POWER BALANCE CONTROL IN OPTICAL TRANSMITTERS

CROSS-REFERENCE TO RELATED APPLICATIONS

This is the first application filed in respect of the present invention.

FIELD OF THE INVENTION

The present application relates generally to optical transmission systems, and more specifically, to methods of quadrature power balance control in optical transmitters.

BACKGROUND

Figure 1:
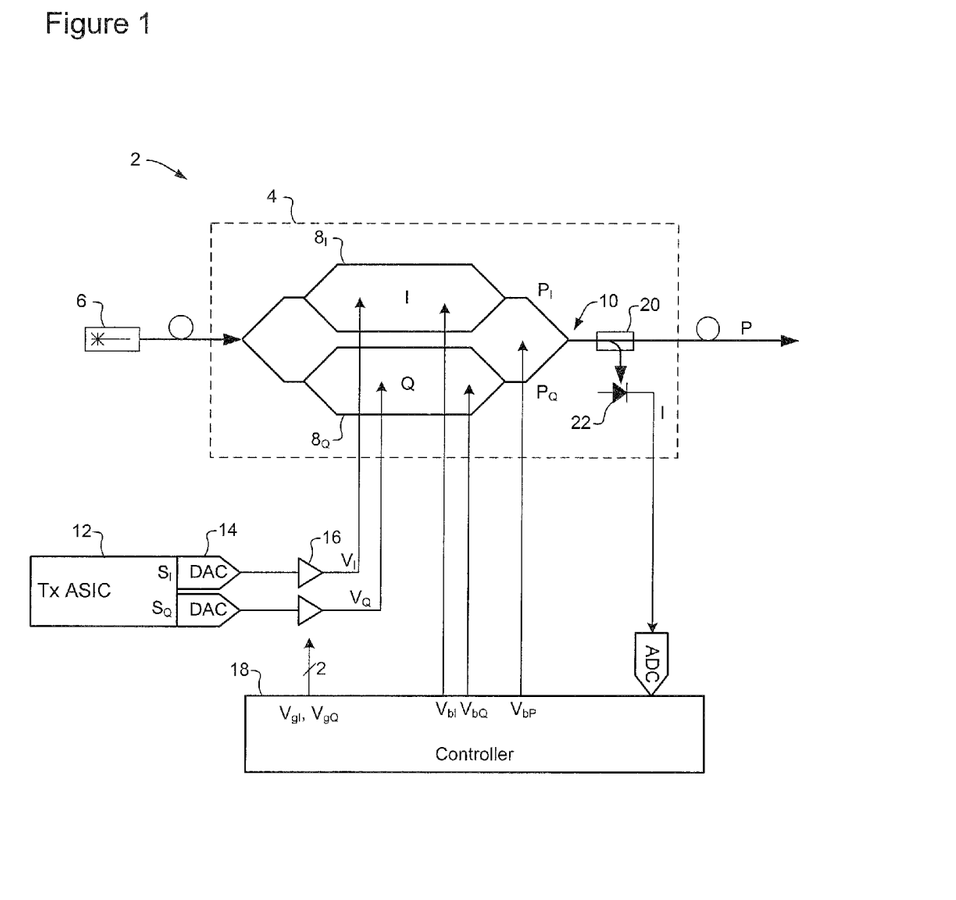
FIG. 1 is a block diagram schematically illustrating an optical transmitter based on a Dual Parallel Mach-Zehnder (DPMZ) modulator.

FIG. 1 schematically illustrates an optical transmitter 2 in which a Dual Parallel Mach-Zehnder (DPMZ) modulator 4 is used to generate a modulated optical signal for transmission through an optical communications system. In the transmitter of FIG. 1, a narrow band light source 6 (such as a laser diode, for example) generates a narrow band continuous wave (CW) light which is supplied to an input of the DPMZ modulator 4. Within the modulator 4, the CW light is divided into two light paths, which are identified as the In-phase (I) and Quadrature (Q) branches. Each branch includes a respective internal Mach-Zehnder modulator 8 designed to modulate the light using a respective drive signal to yield a corresponding modulated branch signal. At the output 10 of the dual branch Mach-Zehnder modulator 8, the two modulated branch signals are combined to generate the modulated optical signal for transmission through the optical communications system.

In the transmitter of FIG. 1, the internal MZ modulators 8 are driven by respective In-phase and quadrature drive signals $V_I$ and $V_Q$, which are generated by a digital synthesizer 12 in a manner known in the art. For example, the digital synthesizer 12 (which may be configured as an Application Specific Integrated Circuit) may operate to generate a set of digital in-phase and quadrature signals. In FIG. 1, these digital signals are indicated as $S_I$ and $S_Q$. A respective Digital to Analog Converter (DAC) 14 may be used to convert the digital signals to analogue, which may be conditioned using analog variable gain amplifiers (VGAs) 16 and filters (not shown) in a conventional manner to produce the analogue drive signals $V_I$ and $V_Q$ needed to drive the DPMZ modulator 4.

In order to optimize performance of the DPMZ modulator 4, a controller 18 is typically used to generate a set of bias signals for controlling a bias point of each internal MZ modulator 8 and a phase relationship between the two branches. An optical tap 20 may supply a portion of the output light to a photodetector 22 which outputs a tap signal I that is proportional to the power level P of the modulated optical signal appearing at the output 10 of the DPMZ modulator 4. Typically, the controller 18 implements a set of feed-back control loops based on a tap signal I for calculating a respective bias signal $V_{bI}$ and $V_{bQ}$ for each internal modulator 8, and a phase bias signal $V_{bP}$ is used to control the phase relationship between the two modulated branch signals. The bias signals $V_{bI}$, $V_{bQ}$ and $V_{bP}$ are normally calculated based on the response characteristics of the DPMZ modulator 4 and the desired modulation format of the output optical signal. For example, in order to generate Quadrature Phase Shift Keying (QPSK) and Quadrature Amplitude Modulation (QAM) symbol constellations, the bias signals $V_{bI}$, $V_{bQ}$ and $V_{bP}$ are calculated to obtain a "Min/Min/Quad" bias condition of the DPMZ modulator 4, in which each internal MZ modulator 8 is biased at a minimum of its respective response function, and the phase bias signal $V_{bP}$ is set to maintain quadrature (i.e. a 90° phase difference) between the two modulated branch signals.

In addition to controlling the bias point of each internal MZ modulator 8 and the phase relationship between the two branches, it would be desirable to also determine and control the power balance between the two branches. This may be referred to as the I/Q power balance of the DPMZ modulator 4, and may be denoted as $P_I/P_Q$, where $P_I$ is the optical power level of the modulated In-phase optical signal, and $P_Q$ is the optical power level of the modulated quadrature optical signal. Controlling the I/Q power balance is important for maximizing the signal-to-noise ratio (SNR) since with an ideal transmitter and channel, for circular-Gaussian noise the SNR is maximized when $P_I=P_Q$. It is not possible to control the I/Q balance using the configuration in FIG. 1 and by just measuring average optical power as there is only one optical tap, so other techniques are required.

Figure 2:
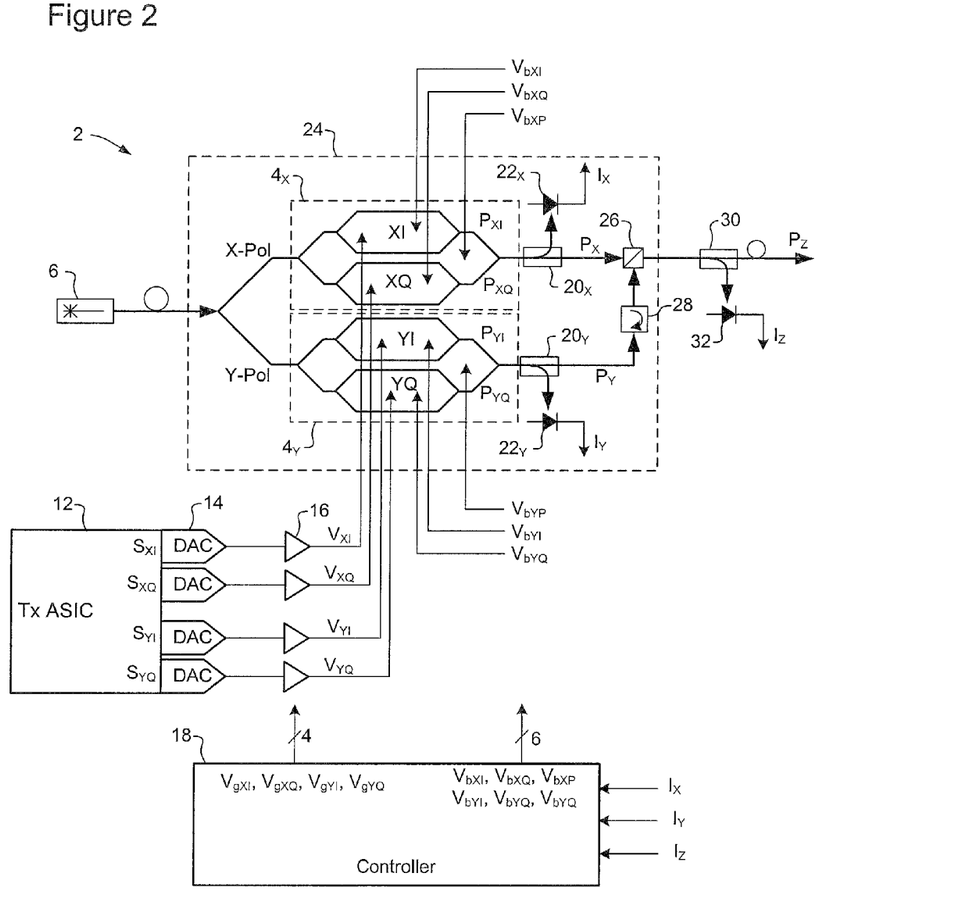
FIG. 2 is a block diagram schematically illustrating an optical transmitter based on a Quad Parallel Mach-Zehnder (QPMZ) modulator.
Figure 3A:
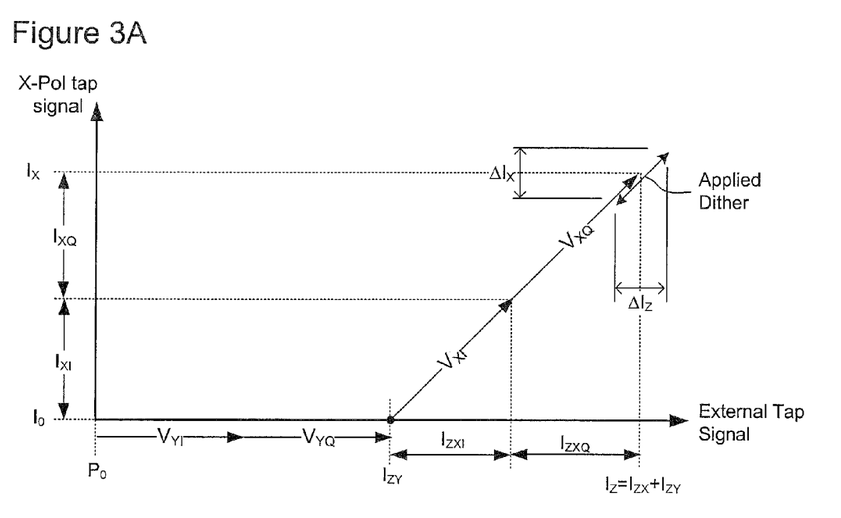
FIGS. 3A and 3B illustrates a response of the transmitter of FIG. 3.
Figure 3B:
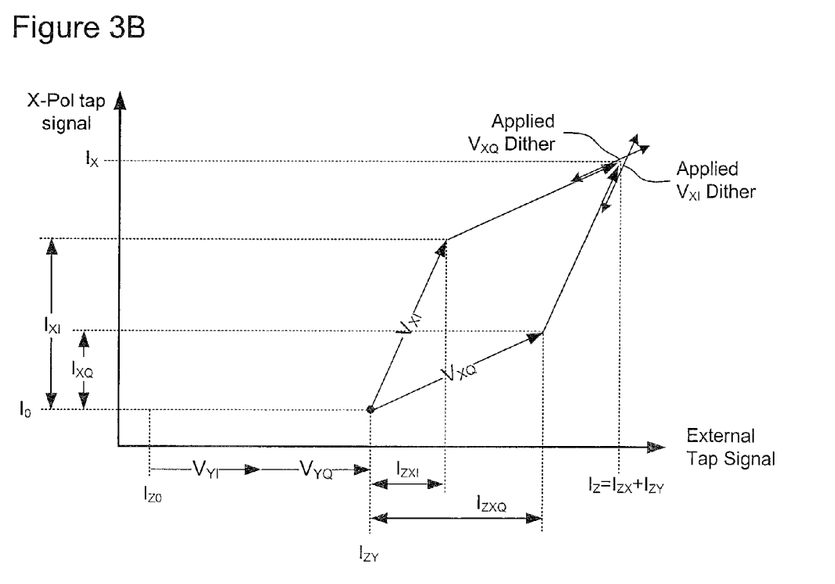

FIG. 2 schematically illustrates an optical transmitter 2 in which a pair of DPMZ modulators 4 are connected in parallel to produce a Quad Parallel Mach-Zehnder (QPMZ) modulator 24 which generates a polarization multiplexed optical signal for transmission through an optical communications system. In the transmitter of FIG. 2, a narrow band light source 6 (such as a laser diode, for example) generates a narrow band continuous wave (CW) light which is supplied to an input of the QPMZ modulator 24. Within the modulator, the CW light is divided into two light paths, which are arbitrarily designated as X-Pol. and Y-Pol. Each path includes a respective DPMZ modulator 4 which operates substantially as described above with reference to FIG. 1. Thus, in the example of FIG. 2, the light in the X-Pol path is divided into I and Q branches, and modulated using respective drive signals $V_{XI}$ and $V_{XQ}$. The two modulated branch lights (having average power levels of $P_{XI}$ and $P_{XQ}$, respectively) are then combined to yield a corresponding X-Pol output light having a power level of $P_X$. Similarly, the light in the Y-Pol path is divided into YI and YQ branches, and modulated using respective drive signals $V_{YI}$ and $V_{YQ}$. The two modulated branch lights (having average power levels of $P_{YI}$ and $P_{YQ}$, respectively) are then combined to yield a corresponding Y-Pol output light having a power level of $P_Y$. The X- and Y-polarization lights output from each DPMZ modulator 4 are then combined using a polarization beam combiner 26 to yield a polarization multiplexed optical signal at the output of the QPMZ modulator 24. A polarization rotator 28 may be used to ensure that the X- and Y-polarization lights are linearly polarized and are orthogonal to each other at the respective inputs of the polarization beam combiner 26. As in the example of FIG. 1, a controller 18 may use tap signals $I_X$ and $I_Y$ from each polarization in order to optimize performance of the respective DPMZ modulator 4. In addition, an external tap 30 and photodetector 32 is used to obtain a corresponding external tap signal Iz that is proportional to the power level Pz of the polarization multiplexed optical signal output from the QPMZ modulator 24. FIGS. 3A and 3B illustrate an X-polarization response of the QPMZ modulator 24, in which X-polarization tap signal $I_X$ is shown on the vertical axis and the external tap signal $I_Z$ is shown on the horizontal axis. FIG. 3A shows an idealized response for non-inverting taps 20, infinite extinction ratio and zero leakage. FIG. 3B shows a response of a real transmitter (ie. non-zero leakage, finite extinction ratio etc.) with non-ideal taps, such as inverting taps.

In general, it would be desirable to be able to determine and control the power balance between each of the internal modulators 8 of the QPMZ modulator 24. Using the notation of FIGS. 2 and 3, it would be desirable to determine and control the relationship between each of the branch optical power levels $P_{XI}$, $P_{XQ}$, $P_{YI}$ and $P_{YT}$. However, the same difficulties discussed above with reference to FIG. 1 also arises in the QPMZ modulator 24. In the presence of non-ideal performance, the power balance cannot be accurately determined by applying a dither to a drive signal and then measuring the corresponding response in one of the tap signals $I_X$, $I_Y$ or $I_Z$. This problem is compounded in cases in which the taps 20 are inverting.

Techniques that overcome at least some of the aforementioned limitations of the prior art remain highly desirable.

SUMMARY

An aspect of the present invention provides a method of controlling an optical transmitter having a Dual Parallel Mach-Zehnder (DPMZ) modulator. An I-Q power balance between respective branches of the DPMZ modulator is detected, and at least one parameter of the DPMZ modulator is adjusted to drive the I-Q power balance to a predetermined target value. An optical transmitter may have Quad Parallel Mach-Zehnder (QPMZ) modulator having a pair of parallel DPMZ modulators for modulating respective X- and Y-polarization lights. In such cases, an X-Y power imbalance between the two polarization lights is detected, and at least one parameter of the QPMZ modulator is adjusted to drive the X-Y power imbalance to a predetermined value.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION

The present application provides techniques for determining and controlling power balance in optical transmitters, in the presence of non-ideal performance and inverting taps.

For a DPMZ modulator with non-inverting taps biased at Min/Min/Quad, it can be shown that:

$$\frac{I_{dc}}{I_{max}} = \frac{I_{dc,I}}{I_{max}} + \frac{I_{dc,Q}}{I_{max}} \qquad \text{Eq. 1}$$

$$\frac{I_{dc,I}}{I_{max}} = A^2[1 + \cos(k_I V_{bI}) \cdot \langle \cos(k_I V_I) \rangle]$$

$$\frac{I_{dc,Q}}{I_{max}} = A^2[1 + \cos(k_Q V_{bQ}) \cdot \langle \cos(k_Q V_Q) \rangle]$$

where A is an amplitude scaling parameter; $k_I$ and $k_Q$ are scaling constants, $I_{max}$ is the tap signal measured when the DPMZ 4 is biased for Max/Max/Max, or maximum throughput; and the operator $\langle \ \rangle$ denotes a mean or time averaged value.

The total direct current (DC) photocurrent at the tap 20, $I_{dc}$, is measured and known. What is not known is the relative contribution of the I and Q branches to this total DC photocurrent (i.e. the I-Q power balance) and the max photocurrent which may change due to variations of laser power, modulator insertion loss, and photodetector responsivity with temperature and life.

If a dither signal $d_I$ is applied to the In-phase bias signal $V_{bI}$, the second-harmonic of this dither is proportional to the second order derivative of the above equation with respect to $V_{bI}$. Thus:

$$\frac{I_{2H,I}}{I_{max}} = A^2 k^2 \cos(k_I V_{bI}) \cdot \langle \cos(k_I V_I) \rangle \qquad \text{Eq. 2}$$

Eliminating the cosine terms results in a linear relation between the $2^{nd}$ harmonic photocurrent of In-phase bias dither $d_I$ and the contribution of In-phase drive $V_I$ to the total DC photocurrent I. This linear relationship can be expressed as:

$$\frac{I_{2H,I}}{I_{max}} = a_I \cdot \frac{I_{dc,I}}{I_{max}} + b_I \qquad \text{Eq. 3}$$

Where a and b depend on modulator DC Vpi values, dither waveform shape (sine-wave, square-wave, etc.) and modulator extinction ratios. In practice a and b can be measured as part of a process of calibration of the DPMZ modulator, for example during start-up of the transmitter 2. Similarly, applying a dither signal $d_Q$ to the Quadrature-phase bias signal $V_{bQ}$, yields a linear relationship.

$$\frac{I_{2H,Q}}{I_{max}} = a_Q \cdot \frac{I_{dc,Q}}{I_{max}} + b_Q \qquad \text{Eq. 4}$$

Equations 1, 3 and 4 above can then be solved to determine $I_{dc,I}$, $I_{dc,Q}$, and $I_{max}$, from which the I-Q power imbalance can be readily found as:

$$PimbIQ = \frac{\frac{I_{dc,I}}{I_{max}}}{\frac{I_{dc,Q}}{I_{max}}}. \qquad \text{Eq. 5}$$

Figure 4:
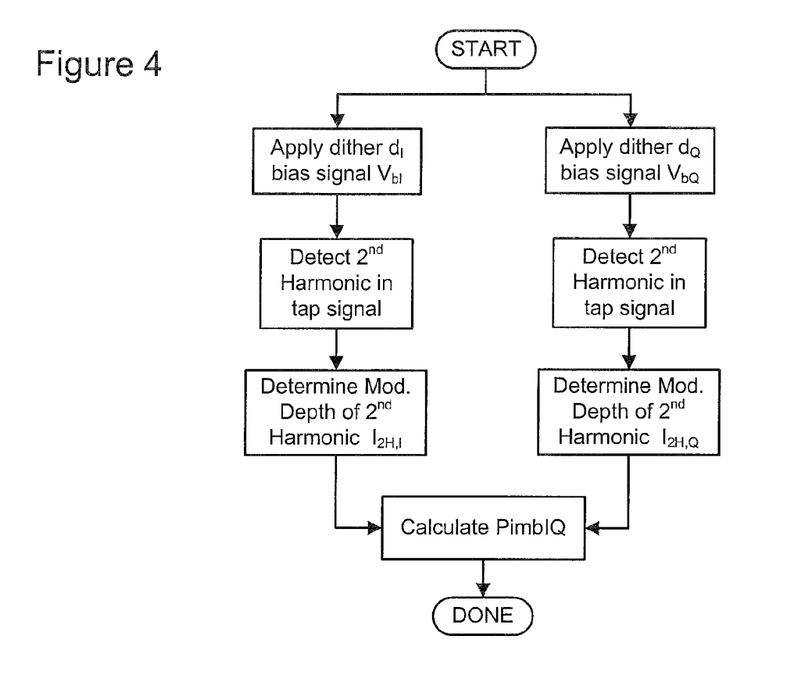
FIG. 4 is a flow chart illustrating a method of determining an I-Q power imbalance in the DPMZ modulator of FIG. 1.

FIG. 4 is a flow-chart illustrating the above process for determining the I-Q power imbalance. As may be seen in FIG. 4, a dither signal $d_I$ having a known modulation depth and frequency is applied to the In-phase bias signal $V_{bI}$, and the modulation depth $I_{2H,I}$ of the tap signal I at a frequency corresponding to the second harmonic of the applied dither signal is detected. Similarly, a dither signal $d_Q$ having a known modulation depth and frequency is applied to the Quadrature-phase bias signal $V_{bIQ}$ and the modulation depth $I_{2H,Q}$ of the tap signal I at a frequency corresponding to the second harmonic of the applied dither signal is detected. The second harmonic modulation depths are then used as described above to determine the I-Q power balance PimbIQ. In some embodiments, the dither signals $d_I$ and $d_Q$ are applied to their respective bias signals at different times, in which case both dither signals may have the same frequency and modulation depth. In other embodiments, the dither signals $d_I$ and $d_Q$ are applied to their respective bias signals simultaneously, in which the respective dither signal frequencies are preferably selected so that the second harmonic of each dither signal can be unambiguously detected in the tap signal I.

If desired, the controller 18 can implement a control loop to drive the I-Q power imbalance to any desired target value. For example, if it is desired that the I and Q branch optical signals $P_I$ and $P_Q$ contribute equally to the output power P, then the controller can control the DPMZ modulator 4 to drive PimbIQ to a value of 1. One way of accomplishing this may be to adjust the amplitude of either one (or both) of the drive signals $V_I$ and $V_Q$. Other target values, and/or means of adjusting the optical power of each branch signal may equally be used.

An advantage of the above described method is that it enables accurate I-Q power imbalance measurement and control even in the presence of non-ideal components. As such, the above described process can be considered a general solution that is suitable for real (non-ideal) DPMZ modulators.

As may be appreciated, the above methods may be readily extended to enable computation of I-Q power imbalance in the QPMZ modulator 24 of FIG. 3. In this case, equations 3 and 4 above are duplicated for each of the X and Y polarization DPMZ modulators $4_X$ and $4_Y$, as:

For the X-polarization DPMZ modulator $4_X$:

$$\frac{I_{2H,ZXI}}{I_{max,ZX}} = a_{ZXI} \cdot \frac{I_{dc,ZXI}}{I_{max,ZX}} + b_{ZXI} \qquad \text{Eq. 6}$$

$$\frac{I_{2H,ZXQ}}{I_{max,ZX}} = a_{ZXQ} \cdot \frac{I_{dc,ZXQ}}{I_{max,ZX}} + b_{ZXQ} \qquad \text{Eq. 7}$$

For the Y-polarization DPMZ modulator $4_Y$:

$$\frac{I_{2H,ZYI}}{I_{max,ZY}} = a_{ZXI} \cdot \frac{I_{dc,ZYI}}{I_{max,ZY}} + b_{ZYI} \qquad \text{Eq. 8}$$

$$\frac{I_{2H,ZYQ}}{I_{max,ZY}} = a_{ZYQ} \cdot \frac{I_{dc,ZYQ}}{I_{max,ZY}} + b_{ZYQ} \qquad \text{Eq. 9}$$

In addition, the total DC photocurrent at the external tap 30, $I_{dc,Z,total}$ can be measured, and thus is known.

$$I_{dc,Z,total} = I_{dc,ZXI} + I_{dc,ZXQ} + I_{dc,ZYI} + I_{dc,ZYQ} \qquad \text{Eq. 10}$$

In the above equations 6-10, the index Z is added to indicate that the applicable value is measured at the external tap 30. Thus, for example, $I_{dc,ZXI}$ is the portion of the total external tap DC photocurrent, $I_{dc,Z,total}$, that is due to the In-phase branch of the X-polarization PDMZ modulator $4_X$. The method described above with reference to FIG. 4 can be used to apply a dither signal to each of the bias signals $V_{bXI}$, $V_{bXQ}$, $V_{bYI}$, and $V_{bYQ}$, and detect the respective second harmonic modulation depths $I_{2H,ZXI}$, $I_{2H,ZXQ}$, $I_{2H,ZYI}$, and $I_{2H,ZYQ}$, of the external tap signal $I_Z$. Similarly, the scaling factors a and b in each of equations 6-10 can be measured as part of a process of calibration of the QPMZ modulator, for example during start-up of the transmitter 2.

The above set of equations 6-10 can not be solved directly, because there are 6 unknowns ($I_{dc,ZXI}$, $I_{dc,ZXQ}$, $I_{max,ZX}$, $I_{dc,ZYI}$, $I_{dc,ZYQ}$, $I_{max,ZY}$) in only 5 equations. This problem can be overcome by determining the X-Y power imbalance, which may be defined as:

$$PimbXY = \frac{P_Y}{P_X} = \frac{I_{dc,ZYI} + I_{dc,ZYQ}}{I_{dc,ZXI} + I_{dc,ZXQ}} + b_{ZYI} \qquad \text{Eq. 11}$$

Representative methods for determining the X-Y power imbalance are described below.

FIG. 3A is a diagram illustrating response of the QPMZ modulator 24 to the X-polarization drive signals $V_{XI}$ and $V_{XQ}$, assuming non-inverting taps 20, 30, zero leakage and infinite extinction ratio. In FIG. 3A, the external tap signal $I_Z$ is shown on the horizontal axis, and the X-polarization tap signal $I_X$ is shown on the vertical axis. The X-Polarization In-phase and quadrature drive signals $V_{XI}$ and $V_{XQ}$ are represented by vectors, the length of which is proportional to the modulator response to each drive signal. As may be seen in FIG. 3A, each drive signal makes a corresponding contribution to the X-polarization tap signal $I_X$ and the external tap signal $I_Z$. Using the notation in FIGS. 2 and 3A, it may be seen that $I_Z = I_{ZX} + I_{ZY}$, where $I_{ZX}$ is the portion of $I_Z$ that is due to the X-Pol. light $P_X$; and $I_{ZY}$ is the portion of $I_Z$ that is due to the Y-Pol. light $P_Y$.

Additionally, it may be seen that $I_{ZX} = I_{ZXI} + I_{ZXQ}$; and, similarly, $I_{ZY} = I_{ZYI} + I_{ZYQ}$ where $I_{ZXI}$ is the portion of $I_Z$ that is due to the X-Pol. In-phase drive signal $V_{XI}$; $I_{ZXQ}$ is the portion of $I_Z$ that is due to the X-Pol. quadrature-phase drive signal $V_{XQ}$; $I_{ZYI}$ is the portion of $I_Z$ that is due to the Y-Pol. In-phase drive signal $V_{YI}$; and $I_{ZYQ}$ is the portion of $I_Z$ that is due to the Y-Pol. quadrature-phase signal $V_{YQ}$.

Figure 5:
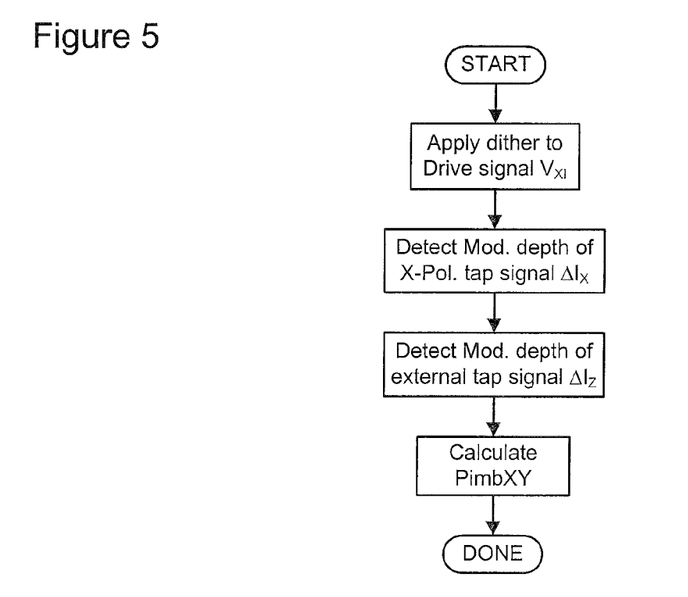
FIG. 5 is a flow chart illustrating a method of determining an X-Y power imbalance in the QPMZ modulator of FIG. 3.

As may be seen in FIG. 3A, $I_X = I_{XI} + I_{XQ}$ where $I_{XI}$ is the portion of $I_X$ that is due to the X-Pol. In-phase drive signal $V_{XI}$; and $I_{XQ}$ is the portion of $I_X$ that is due to the X-Pol. quadrature-phase drive signal $V_{XQ}$. Similarly, $I_Y = I_{YI} + I_{YQ}$ where $I_{YI}$ is the portion of $I_Y$ that is due to the Y-Pol. In-phase drive signal $V_{YI}$; and $I_{YQ}$ is the portion of $I_Y$ that is due to the Y-Pol. quadrature-phase drive signal $V_{YQ}$ FIG. 5 is a flow chart illustrating a representative method for determining the X-Y power balance $P_Y/P_X$ of the QPMZ modulator 24, for the ideal response illustrated in FIG. 3A. Referring to FIG. 5, a dither signal having a known frequency and modulation depth may be applied to the drive signal $V_{XI}$, either digitally by the synthesizer 12 or via the VGA gain control signal $V_{gXI}$. The X-Pol. tap signal $I_X$ is then processed to detect the modulation $\Delta I_X$ at a frequency corresponding to the dither signal. Similarly, the external tap signal $I_Z$ is processed to detect the modulation $\Delta I_Z$ at a frequency corresponding to the dither signal. The X-Y power imbalance $P_Y/P_X$ can then be determined as $$PimbXY. = \frac{P_Y}{P_X} = \frac{\frac{\Delta I_X}{I_{dc,X}}}{\frac{\Delta I_Z}{I_{dc,Z,total}}} - 1$$

where $$\frac{\Delta I_X}{I_{dc,X}}$$

is the normalized modulation depth of the X-Pol. tap signal $I_X$ at the dither frequency, and $$\frac{\Delta I_Z}{I_{dc,Z,total}}$$

is the normalized modulation depth of the external tap signal $I_Z$ at the dither frequency. $I_{dc,X}$ and $I_{dc,Z,total}$ are respective direct current values of the X-Pol. tap signal $I_X$ and the external tap signal $I_Z$. As described above, both of these values can be readily measured, and so are known.

In the above description, the X-Y power balance is determined by applying a dither to the XI drive signal $V_{XI}$. It will be appreciated, that the same method may equally be used to find the X-Y power balance by applying a dither to the XQ drive signal $V_{XQ}$. Similarly, the dither may be applied to either of the Y-polarization drive signals $V_{YI}$ and $V_{YQ}$ to find the X-Y power balance. For the case of ideal taps, all of these methods would be expected to yield an identical result. For the case of non-ideal taps, it is useful to apply dithers to all of the drive signals, either simultaneously or sequentially, to determine respective X-Y power imbalance values, and then calculate an average.

Once the X-Y power balance has been determined, equations 6-11 above may be used to find $I_{dc,ZXI}$, $I_{dc,ZXQ}$, $I_{max,ZX}$, $I_{dc,ZYI}$, $I_{dc,ZYQ}$ and $I_{max,ZY}$, and thus the respective I-Q power imbalances of the X- and Y-polarization DPMZ modulators 4. The techniques described above can also be used to control both the I-Q power imbalances and the X-Y power imbalance to respective desired target values.

The techniques described above apply to real (non-ideal) DPMZ and QPMZ modulators. Where the internal taps 20 of the QPMZ modulator 24 are highly non-ideal, such as inverting taps, these techniques will not yield accurate results. An extension of the above techniques for inverting taps is described below.

Figure 6:
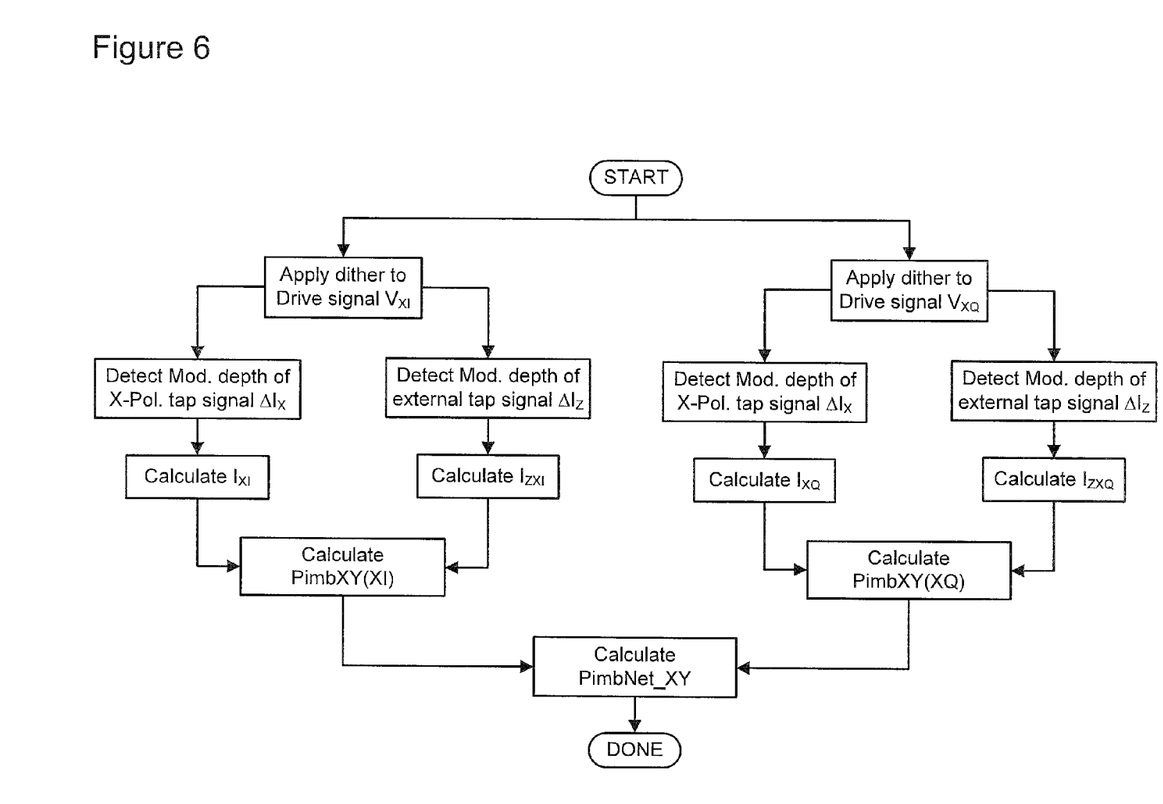
FIG. 6 is a block diagram schematically illustrating an alternative method of determining an X-Y power imbalance in the QPMZ modulator of FIG. 3

FIG. 6 is a flow chart illustrating a representative method for determining the X-Y power balance $P_Y/P_X$ of the QPMZ modulator 24, for the case of non-ideal response illustrated in FIG. 3B. Referring to FIGS. 3B and 6, a dither signal $d_{XI}$ having a known frequency and modulation depth may be applied to the drive signal $V_{XI}$ either digitally by the synthesizer 12 or via the VGA gain control signal $V_{gXI}$. The X-Pol. tap signal $I_X$ is then processed to detect the modulation $\Delta I_{XI}$ at a frequency corresponding to the dither signal $d_{XI}$. Similarly, a dither signal $d_{XQ}$ having a known frequency and modulation depth may be applied to the drive signal $V_{XQ}$ either digitally by the synthesizer 12 or via the VGA gain control signal $V_{gXQ}$. The X-Pol. tap signal $I_X$ is then processed to detect the modulation $\Delta I_{XQ}$ at a frequency corresponding to the dither signal $d_{XI}$.

As may be appreciated, the dither signals $d_{XI}$ and $d_{XQ}$ may be applied to the X-Polarization drive signals $V_{XI}$ and $V_{XQ}$ either sequentially or simultaneously, as desired. In cases where the dither signals are applied sequentially, each dither signal may have the same frequency. In cases where the dither signals are applied simultaneously, the respective frequencies of the dither signals are preferably chosen such that modulation components of each dither may be unambiguously identified in the X-Pol tap signal $I_X$ and the external tap signal $I_Z$.

Using the above internal and external response values, a set of X-Y power imbalance values may be found as, $$PimbXY(XI) = \frac{\frac{\Delta I_{XI}}{I_{dc,X}} \cdot CorrFactor_X}{\frac{\Delta I_{ZXI}}{I_{dc,Z,total}}} - 1$$

and $$PimbXY(XQ) = \frac{\frac{\Delta I_{XQ}}{I_{dc,X}} \cdot CorrFactor_X}{\frac{\Delta I_{ZXQ}}{I_{dc,Z,total}}} - 1$$

Where PimbXY(XI) is the X-Y power balance value calculated based on the dither signal $d_{XI}$ applied to the XI drive signal $V_{XI}$, and PimbXY(XQ) is the X-Y power balance value calculated based on the dither signal $d_{XQ}$ applied to the XQ drive signal $V_{XQ}$. CorrFactorX corrects the apparent dither modulation depth measured at the (DPMZ) optical tap 20 due to the presence of the optical DC offset Io to yield the actual dither modulation depth.

In some embodiments, either one of these values may be taken as the X-Y power balance, and used to solve equations 6-11 above and thereby determine the power balance across the QPMZ modulator 24. However, in presence of non-idealities associated with inverting taps, improved accuracy may be obtained by calculating a net X-Y power imbalance PimbNet_XY using an equation of the form:

$$PimbNet\_XY = PimbXY(XI) \cdot \frac{I_{ZXI}}{I_{ZX}} + PimbXY(XQ) \cdot \left(1 - \frac{I_{ZXI}}{I_{ZX}}\right)$$

An advantage of the method described above is that the internal and external responses $I_{XI}$, $I_{XQ}$, $I_{ZXI}$, $I_{ZXQ}$ can be isolated from tap signal component $I_0$ due to finite extinction ratio and leakage, and also allows the magnitude of $I_0$ to be determined. As such, the above-described methods enable the response of the QPMZ modulator 24 to be accurately characterised, even in the presence of non-ideal component performance and inverting taps. Control functions based on the internal and external response components can thus be used to optimize QPMZ modulator 24 performance across comparatively wide manufacturing tolerances, which enables a wider range of optical components and manufacturers to be used, both of which help to lower costs.

In the foregoing description, the X-Y power imbalance is obtained by applying a dither signal to one or both of the X-polarization drive signals. It will be appreciated that substantially the same methods may be employed to determine the X-Y power imbalance by applying a dither signal to one or both of the Y-polarization drive signals.

If desired, the controller 18 can implement a control loop to drive the X-Y power imbalance to any desired target value. For example, if it is desired that the X- and Y-Polarization optical signals $P_X$ and $P_Y$ to contribute equally to the output power P, then the controller can control the QPMZ modulator 24 to drive PimbNet_XY to a value of 1. One way of accomplishing this is to vary the amplitude of the respective drive signals of either one (or both) of the two polarizations. Other target values, and/or means of adjusting the optical power of each polarization signal may equally be used.

Another important issue, is the control of the absolute drive signals ($V_{XI}$, $V_{XQ}$, $V_{YI}$ and $V_{YQ}$). Hypothetically, if the QPMZ was ideal (and the X,Y DPMZs were identical) and we wanted to balance the quadrature powers so they were equal (no X-Y imbalance, no I-Q imbalance), then $V=V_{XI}=V_{XQ}=V_{YI}=V_{YQ}$. The latter condition can be met for any value of V, thus we also need a method to control the absolute value of V. Advantageously, the previously described techniques also provide a method to control the absolute drive signals. Recall that the following parameters are extracted: $I_{dc,ZXI}$, $I_{dc,ZXQ}$, $I_{max,ZX}$, $I_{dc,ZYI}$, $I_{dc,ZYQ}$ and $I_{max,ZY}$. We can now monitor and set the criteria to control or constrain the absolute drive signals; one possibility is to constrain the modulation loss range: minimum modulation loss<($I_{dc,ZXI}$+$I_{dc,ZXQ}$)/$I_{max,ZX}$, ($I_{dc,ZYI}$+$I_{dc,ZYQ}$)/$I_{max,ZY}$<maximum modulation loss.

Figure 7:
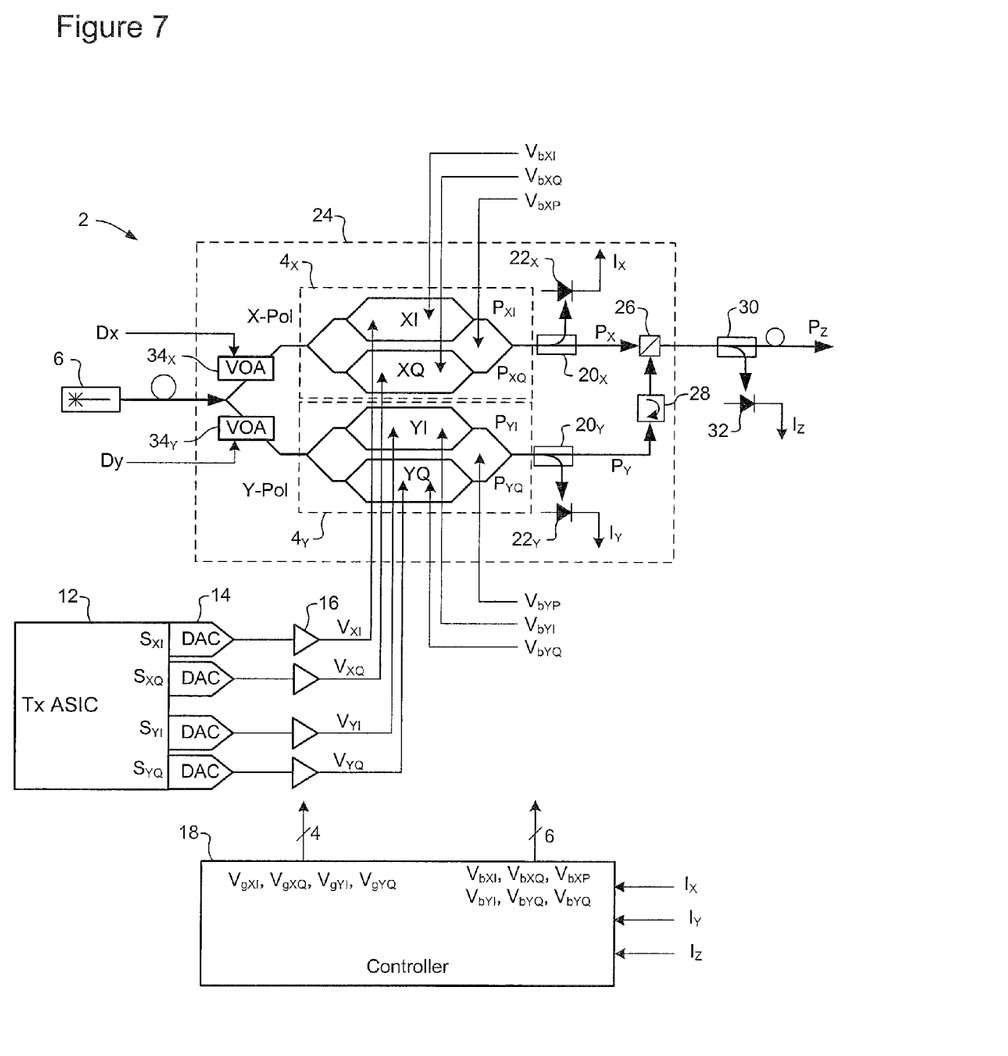
FIG. 7 is a block diagram schematically illustrating another optical transmitter usable in techniques in accordance with the present invention.
Figure 8:
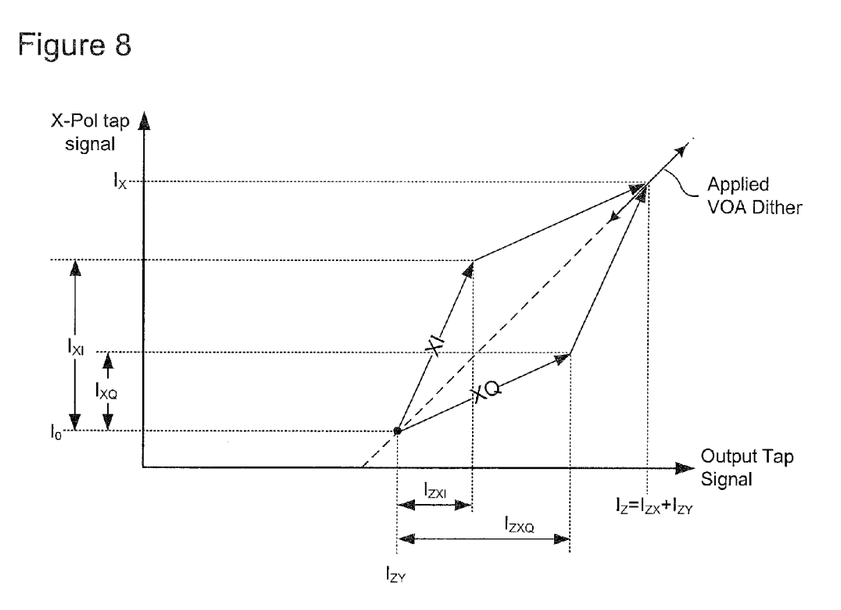
FIG. 8 illustrates a response of the transmitter of FIG. 8.

FIG. 7 illustrates an optical transmitter 2 in which each of the X and Y polarization paths of the QPMZ modulator 24 includes a respective variable optical attenuator (VOA) 34. As may be seen in FIG. 8, applying a dither signal Dx to the X-Pol. VOA $34_X$ causes a linear response in both the X-Pol tap signal $I_X$ and the output tap signal $I_Z$ that effectively averages the responses to the drive signals $V_{XI}$ and $V_{XQ}$. The slope $m_X$ of the response can be determined as:

$$m_X = \left(\frac{\Delta I_X}{\Delta I_Z}\right)$$

where $\Delta I_X$ is the detected modulation depth of the X-Pol. tap signal $I_X$ at a frequency corresponding with the applied dither signal Dx, and $\Delta I_Z$ is the detected modulation depth of the output. tap signal $I_Z$ at a frequency corresponding to the applied dither signal. It is then a simple matter to determine $I_{ZX}$ and $I_{ZY}$, and therefore the X-Y polarization power balance using the slope m, the tap signals $I_X$ and $I_Z$, and $I_0$, as will be readily apparent to those of ordinary skill in the art, upon inspection of FIG. 8. If desired, the controller 18 can implement a control loop to drive the X-Y power imbalance to any desired target value by applying a DC voltage to either one (or both) of the two VOAs 34. Similar to the discussion above, there can be many values of the drive signals and VOA DC voltages that give the same quadrature power relationship. Again, since $I_{dc,ZXI}$, $I_{dc,ZXQ}$, $I_{max,ZX}$, $I_{dc,ZYI}$, $I_{dx,ZYQ}$ and $I_{max,ZY}$ are extracted, we can now monitor and set the criteria to control the drive signals and VOA; one possibility is to keep the modulation loss constant and constrain the optical power:

(1)  ($I_{dc,ZXI}$+$I_{dc,ZXQ}$)/$I_{max,ZX}$, ($I_{dc,ZYI}$+$I_{dc,ZYQ}$)=/$I_{max,ZY}$=modulation loss target, (2) minimum optical power<$I_{max,ZX}$, $I_{max,ZY}$<maximum optical power.

The embodiments of the invention described above are intended to be illustrative only. The scope of the invention is therefore intended to be limited solely by the scope of the appended claims.

We claim:

1. A method of controlling an optical transmitter having a Dual Parallel Mach-Zehnder (DPMZ) modulator having a pair of parallel branches, each branch of the DPMZ modulator having a bias point controlled by a respective bias signal, the method comprising:
   detecting an I-Q power balance between respective branches of the DPMZ modulator by:
      applying a respective dither signal to each one of the bias signals, each dither signal having a known modulation depth and frequency;
      detecting a first modulation depth of an output of the DPMZ modulator at a frequency corresponding to a second harmonic of a first one of the dither signals;
      detecting a second modulation depth of the output of the DPMZ modulator at a frequency corresponding to a second harmonic of the other one of the dither signals; and
      calculating the I-Q power imbalance based on the detected first and second modulation depths; and
   adjusting at least one parameter of the DPMZ modulator to drive the I-Q power balance to a predetermined target value.

2. The method as claimed in claim 1, wherein the dither signals are applied to each one of the bias signals simultaneously.

3. The method as claimed in claim 1, wherein a respective frequency of each dither signal is selected such that the second harmonic of each dither signal can be unambiguously detected in the output of the DPMZ modulator.

4. The method as claimed in claim 1, wherein adjusting at least one parameter of the DPMZ modulator to drive the I-Q power balance to a predetermined target value comprises adjusting the amplitude of at least one drive signal driving a respective branch of the DPMZ modulator.

5. The method as claimed in claim 1, wherein the optical transmitter comprises a Quad Parallel Mach-Zenhder (QPMZ) modulator having a pair of parallel DPMZ modulators for generating a respective X and Y polarization lights, and a polarization beam combiner for combining the X and Y polarization lights to generate a polarization multiplexed optical signal, and wherein the method further comprises:
   detecting an X-Y power imbalance between the X and Y polarization lights; and
   adjusting at least one parameter of the QPMZ modulator to drive the X-Y power imbalance to a predetermined target value.

6. The method as claimed in claim 5, wherein detecting the X-Y power imbalance comprises:
   applying a respective dither signal to a first drive signal driving a respective first branch of a selected DPMZ modulator, the dither signal having a known modulation depth and frequency;
   detecting a first modulation depth of an output of the selected DPMZ modulator at a frequency corresponding to the dither signal;
   detecting a second modulation depth of an output of the QPMZ modulator at a frequency corresponding to the dither signal; and
   calculating the X-Y power imbalance based on the detected first and second modulation depths.

7. The method as claimed in claim 6, further comprising:
calculating a set of X-Y power imbalance values, each X-Y power imbalance value being obtained using a dither signal applied to a respective different one of a set of drive signals of the QPMZ modulator; and
calculating a net X-Y power imbalance as an average of the set of X-Y power imbalance values.

8. The method as claimed in claim 6, wherein calculating the X-Y power imbalance comprises:
calculating an internal response of the QPMZ modulator based on the known modulation depth of the applied dither signal and the detected first modulation depth;
calculating an external response of the QPMZ modulator based on the known modulation depth of the applied dither signal and the detected second modulation depth; and
calculating the X-Y power imbalance based on the calculated internal response and external response.

9. The method as claimed in claim 8, further comprising:
calculating a first X-Y power imbalance value using a dither signal applied to a first drive signal driving one branch of a selected one of the DPMZ modulators;
calculating a second X-Y power imbalance value using a dither signal applied to a second drive signal driving the other branch of the selected DPMZ modulator; and
calculating a net X-Y power imbalance as a function of the first and second X-Y power imbalance values.

10. The method as claimed in claim 5, wherein adjusting at least one parameter of the QPMZ modulator to drive the X-Y power imbalance to a predetermined target value comprises any one or both of:
adjusting the amplitude of at least one drive signal driving a respective branch of the QPMZ modulator; and
applying a DC voltage to a Variable Optical Attenuator operatively connected to attenuate a respective one of the polarization lights.

11. The method as claimed in claim 10, further comprising:
calculating a modulation loss; and
adjusting at least one parameter of the QPMZ modulator to constrain the modulation loss to a predetermined range.

12. The method as claimed in claim 10, further comprising:
calculating an optical power; and
adjusting at least one parameter of the QPMZ modulator to constrain the calculated optical power to a predetermined range.

13. The method as claimed in claim 5, wherein detecting the X-Y power imbalance comprises:
applying a respective dither signal to a first Variable Optical Attenuator associated with a selected DPMZ modulator, the dither signal having a known modulation depth and frequency;
detecting a first modulation depth of an output of the selected DPMZ modulator at a frequency corresponding to the dither signal;
detecting a second modulation depth of an output of the QPMZ modulator at a frequency corresponding to the dither signal; and
calculating the X-Y power imbalance based on the detected first and second modulation depths.

14. An optical transmitter having a Dual Parallel Mach-Zehnder (DPMZ) modulator having a pair of parallel branches, each branch of the DPMZ modulator having a bias point controlled by a respective bias signal, the optical transmitter comprising:
a controller configured to detect an I-Q power balance between respective branches of the DPMZ modulator by:
applying a respective dither signal to each one of the bias signals, each dither signal having a known modulation depth and frequency:
detecting a first modulation depth of an output of the DPMZ modulator at a frequency corresponding to a second harmonic of a first one of the dither signals:
detecting a second modulation depth of the output of the DPMZ modulator at a frequency corresponding to a second harmonic of the other one of the dither signals: and
calculating the I-Q power imbalance based on the detected first and second modulation depths: and
the controller adjusting at least one parameter of the DPMZ modulator to drive the I-Q power balance to a predetermined target value.

15. The optical transmitter as claimed in claim 14, further comprising:
a Quad Parallel Mach-Zenhder (QPMZ) modulator having a pair of parallel DPMZ modulators for generating a respective X and Y polarization lights; and
a polarization beam combiner for combining the X and Y polarization lights to generate a polarization multiplexed optical signal;
wherein the controller is operative to:
detect an X-Y power imbalance between the X and Y polarization lights; and
adjust at least one parameter of the QPMZ modulator to drive the X-Y power imbalance to a predetermined target value.

16. The optical transmitter as claimed in claim 15, wherein the controller is configured to detect the X-Y power imbalance by:
applying a respective dither signal to a first drive signal driving a respective first branch of a selected DPMZ modulator, the dither signal having a known modulation depth and frequency;
detecting a first modulation depth of an output of the selected DPMZ modulator at a frequency corresponding to the dither signal;
detecting a second modulation depth of an output of the QPMZ modulator at a frequency corresponding to the dither signal; and
calculating the X-Y power imbalance based on the detected first and second modulation depths.

17. A non-transitory computer readable medium storing software instructions for execution by a transmitter of an optical communications network, the transmitter including a Dual Parallel Mach-Zehnder (DPMZ) modulator having a pair of parallel branches, each branch of the DPMZ modulator having a bias point controlled by a respective bias signal, the software instructions controlling the transmitter to
detect an I-Q power balance between respective branches of the DPMZ modulator by:
applying a respective dither signal to each one bias signals, each dither signal having a known modulation depth and frequency:
detecting a first modulation depth of an output of the DPMZ modulator at a frequency corresponding to a second harmonic of a first one of the dither signals:
detecting second modulation depth of the output of the DPMZ modulator at a frequency responding to a second harmonic of the other one of the dither signals; and calculating the I-Q power imbalance based on the detected first and second modulation depths; and adjust at least one parameter of the DPMZ modulator to drive the I-Q power balance to a predetermined target value.

* * * * *